United States Patent [19]

Chen et al.

[11] Patent Number: 5,263,644
[45] Date of Patent: Nov. 23, 1993

[54] TEMPERATURE SENSITIVE CONTROLLING DEVICE

[76] Inventors: Hsing Chen, No. 18, Chiu-Kang Road, Chiu-Kang Li, Hsichu City; Horng-Show Koo; Fu-Hsiang Chen, both of No. 47-14, Fan-Po Street, Fan-Po Tsun, Fu-Hsing Hsiang, Chang-Hua Hsien, all of Taiwan

[21] Appl. No.: 951,095

[22] Filed: Sep. 25, 1992

[51] Int. Cl.⁵ ............................................. G05D 23/02
[52] U.S. Cl. .................................. 236/101 R; 60/527
[58] Field of Search ...................... 236/101 R, 101 B; 60/527; 148/402, 527

[56] References Cited

U.S. PATENT DOCUMENTS

| | | | |
|---|---|---|---|
| 4,345,234 | 8/1982 | Reich | 236/101 R X |
| 4,541,735 | 9/1985 | Abu-Isa | 236/101 R X |
| 4,554,027 | 11/1985 | Tautzenberger et al. | 428/675 X |
| 4,798,051 | 1/1989 | Foote | 60/527 |
| 4,808,246 | 2/1989 | Albrecht et al. | 148/527 |

*Primary Examiner*—William E. Tapolcai

[57] ABSTRACT

A temperature sensitive controlling device comprises a casing inside which powders of at least two shape memory alloys are disposed with a shaft movably received therein. The mix of different shape memory alloy powder provides a characteristic curve more desired than its component shape memory alloys and by adjusting the ratio between the component powders, the curve can be adjusted as one expects so that when the powders are subject to temperature variation, the shaft is moved as desired. A method for manufacturing such a temperature sensitive controlling device is also provided. The method comprises the steps of melting material metals of a given ratio together to form a shape memory alloy, atomizing the molten alloy by an inert gas flow to form a first kind of powder, providing at least a second kind of powder with the similar way, mixing these powders together in accordance with a specific ratio, disposing these powers in a casing and then sealing the casing and inserting therein a movable member to be moved by the powders when the powders are subject to temperature variations.

5 Claims, 4 Drawing Sheets

5,263,644

TEMPERATURE SENSITIVE CONTROLLING DEVICE

FIELD OF THE INVENTION

The present invention relates generally to a temperature sensitive controlling device and in particular to a temperature sensitive controlling device made of powders of at least two shape memory alloys (SMAs).

BACKGROUND OF THE INVENTION

Nowadays temperature sensitive controls have been widely applied in a variety of apparatus or appliances, such as electrical cooking devices, electrical power switches, thermostatic devices. The temperature sensitive control may be classified in accordance with the temperature sensitive material thereof into three categories: (1) bi-metal temperature sensitive control, (2) shaped SMA temperature sensitive control and (3) metal powder driving type temperature sensitive control. These temperature sensitive controlling devices may also be classified as linear type and non-linear type in accordance with the characteristic curve thereof. The term "characteristic curve" used herein is referred to the relationship between the elongation or displacement of the controlling device and the temperature variation thereof.

The bi-metal type temperature sensitive controlling device usually has a linear temperature characteristic curve as shown in FIG. 1. Such a controlling device is generally used in electrical switches or protective circuits and the action thereof in response to temperature variation is an ON-OFF type.

The characteristic curve of a shape memory alloy is generally non-linear, such as the one shown in FIG. 2. The general usage of the kind of temperature sensitive controlling device is to provide a switch between an ON and an OFF states. The conventional SMA spring or strip is made of a copper-based alloy. The transition points, which are the temperature at which the SMA changes its shape due to the change of the metallurgical composition thereof and subsequent heat treatment, of the copper-based SMA varies with the frequency of operation and thus making the overall control unstable. Thus such an SMA type temperature sensitive controlling device cannot be adapted on an apparatus which requires frequent switching ON and OFF. This kind of temperature sensitive controlling device is usually used in apparatus with less-frequent switching, such as fire or temperature warning devices or water temperature sensing devices.

The metal powder driving type temperature sensitive controlling device uses high thermal conductivity copper powders to provide a linear response to temperature variation. The slope of the characteristic curve, however, is quite small and thus the response to temperature variation is slow. Currently, such a temperature sensitive controlling device is generally adapted on water temperature controls.

The present invention provides a temperature sensitive controlling device which is made of powders of at least two shape memory alloys of different transition points. By mixing appropriate amounts of these powders together, a characteristic curve different from those of the base shape memory alloys can be obtained. By varying the ratio between theses powders, the characteristic curve can be modified to a desired shape. Thus, the present invention can be used to substitute all the prior art temperature sensitive controlling devices. Therefore, the present invention provides a temperature sensitive controlling device superior to the prior art devices.

OBJECTS OF THE INVENTION

It is therefore an object of the present invention to provide a temperature sensitive controlling device made of powders of at least two shape memory alloys of which the characteristic curve in response to temperature variation can be modified by changing the ratio of the component shape memory alloys.

It is another object of the present invention to provide a method for making a temperature sensitive controlling device made of at least two SMA powders having different transition points so that the characteristic curve thereof is modifiable by changing the ratio of the SMA powders.

It is a further object of the present invention to provide a thermostatic faucet which uses a temperature sensitive controlling device made of at least two SMA powders to control the faucet.

To achieve the above-mentioned object, there is provided a temperature sensitive controlling device comprising a casing inside which powders of at least two shape memory alloys are disposed with a shaft movably received therein. The mix of different shape memory alloy powder provides a characteristic curve more desired than its component shape memory alloys and by adjusting the ratio between the component powders, the curve can be adjusted as one expects so that when the powders are subject to temperature variation, the shaft is moved as desired.

There is also provided a method for manufacturing such a temperature sensitive controlling device comprising the steps of melting material metals of a given ratio together to form a shape memory alloy, atomizing the molten alloy by an inert gas flow to form a first kind of powder, providing at least a second kind of powder with the similar way, mixing these powders together in accordance with a specific ratio, disposing these powders in a casing and then sealing the casing and inserting therein a movable member to be moved by the powders when the powders are subject to temperature variations.

Other objects and advantages of the invention will be apparent from the following description of a preferred embodiment taken in connection with the attached drawings, in which:

DETAILED DESCRIPTION OF THE PREFERRED EMBODIMENT

Figure 1:
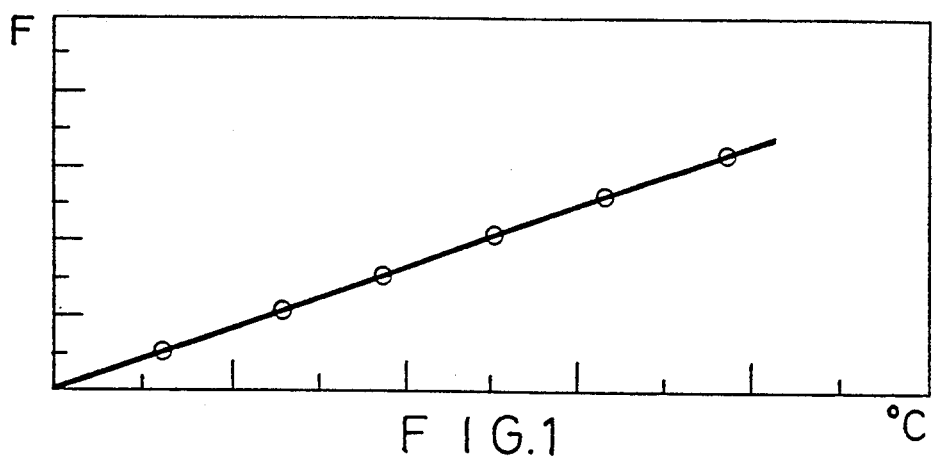
FIG. 1 is a plot of the characteristic curve of a bi-metal type temperature sensitive controlling device.
Figure 2:
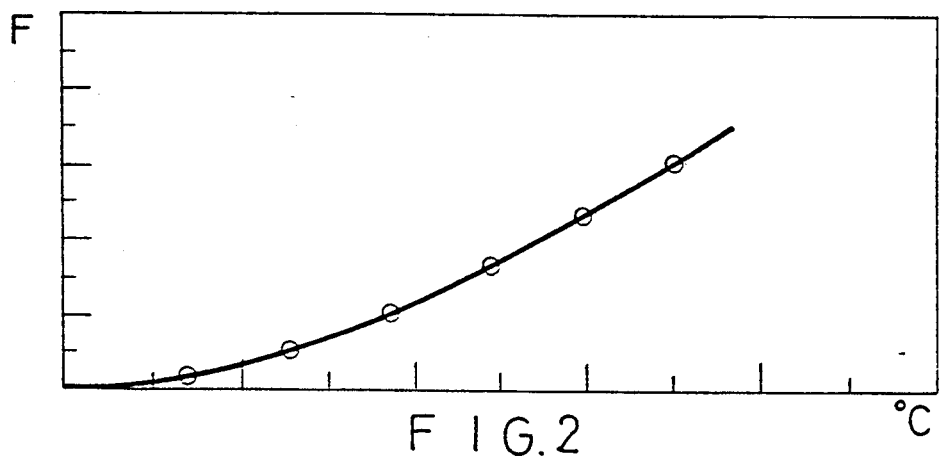
FIG. 2 is a plot of the characteristic curve of a shaped SMA type temperature sensitive controlling device.

Referring to the drawings and in particular to FIGS. 3–6, the temperature sensitive controlling device 100 made in accordance with the present invention may comprise a casing 10 (see FIG. 4) inside which powders of at least two shape memory alloys 40 of different transition points are tightly sealed. The casing 10 is preferably made of a high thermal conductivity material. A shaft 30 is movably received in the casing and in intimate contact with the SMA powders 40 so that when the SMA powders, due to temperature variation, change shapes, the shaft 30 is moved relative to the casing 10.

Figure 3:
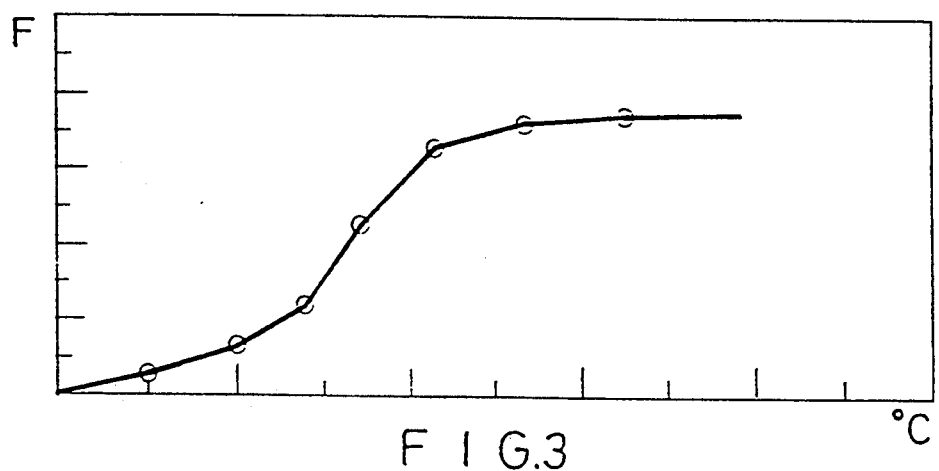
FIG. 3 is a plot of the characteristic curve of a temperature sensitive controlling device made in accordance with the present invention.

The operation principle of the present invention will be explained with particular reference to FIGS. 3, 5 and 6. In FIG. 3, the characteristic curve of a SMA powder is shown with temperature as abscissa and expansion or elongation in one dimension as ordinate. As can be seen in FIG. 3, when the temperature increases, the overall dimension of the SMA powder increases as indicated by the non-linear curve. Each kind of shape memory alloy has its own transition point and a unique characteristic curve associated therewith which is similar as the one shown in FIG. 3. By mixing powders of two or more different kinds of SMA, a characteristic curve different from those of the original alloys can be obtained. This is shown in FIGS. 5 and 6.

Figure 5:
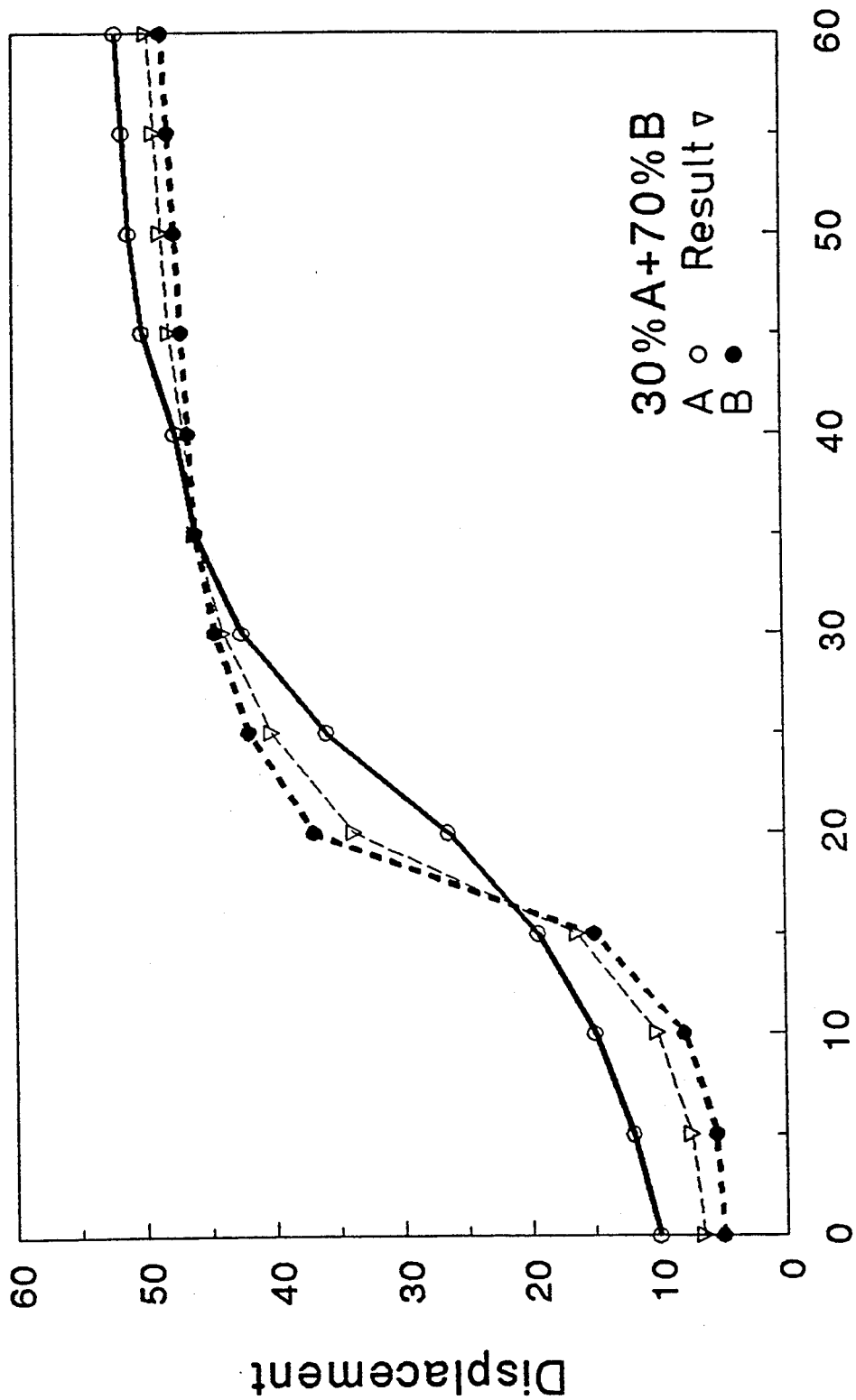
FIGS. 5 and 6 are plots showing the characteristic curves of different compositions of two SMA powders.

In FIG. 5, powders of two shape memory alloys A and B are mixed. The percentage of A is 30% and that of B is 70%. The curve designated by hollow circles is the characteristic curve of shape memory alloy A and that by solid circles is for shape memory alloy B. The resulting curve is represented by inverted triangles.

Figure 6:
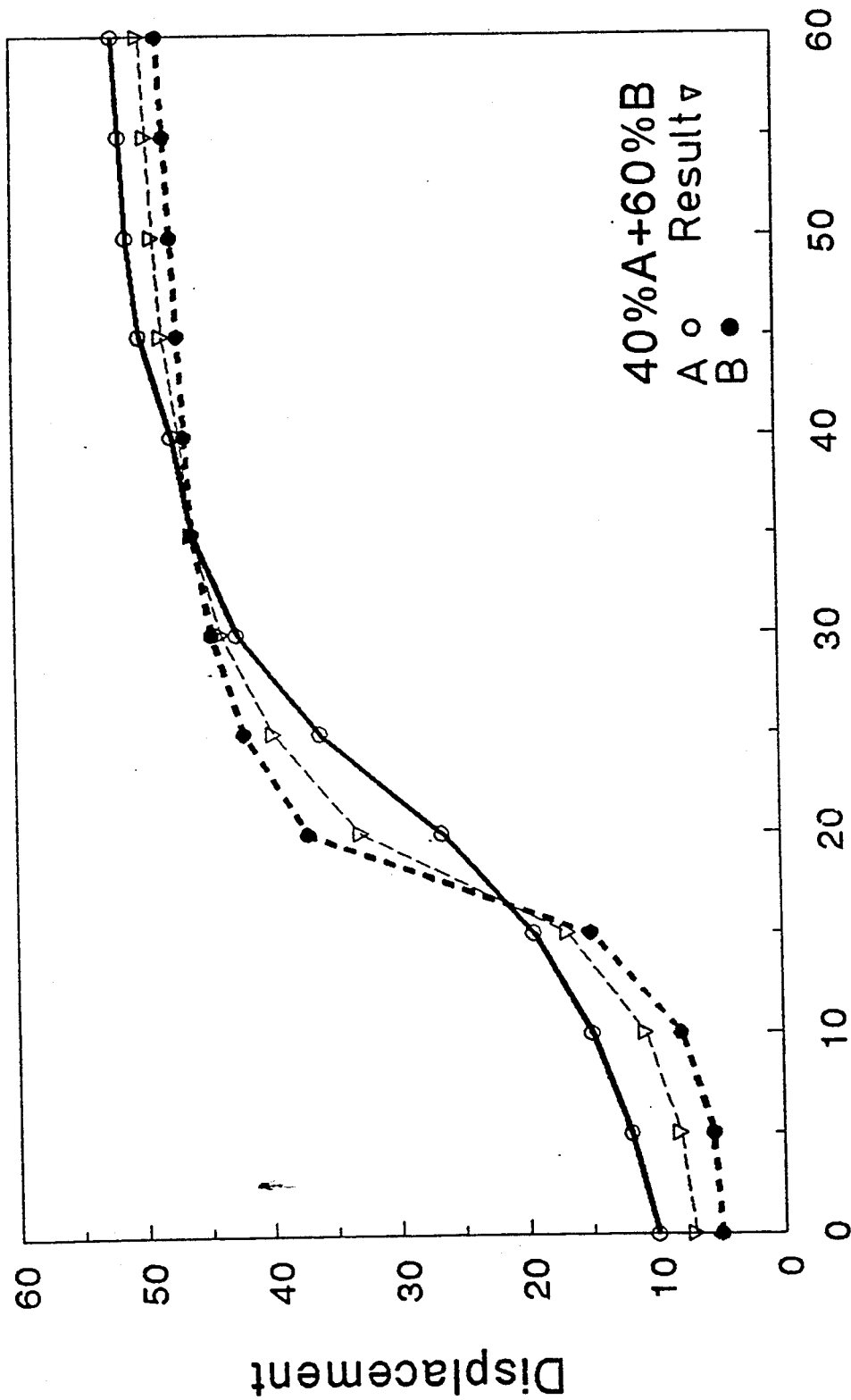

In FIG. 6, a similar plot is shown with A 40% and B 60%. As can be observed from these figures, the resulting curve from the mix of shape memory alloys A and B is located between the curves of shape memory alloys A and B. The resulting curve will tend to approach one of the original curves of A or B, if the amount of that component is increased, as can be seen from a comparison between FIGS. 5 and 6.

In view of the above-stated fact, it is possible for a user to mix two or more SMA powders with different ratio to adjust the resulting characteristic curve to a desired form so as to be possible to be adapted at different applications.

The manufacture of the SMA powder is preferably done with a gas atomizing method. SMA component metals, such as copper, aluminum, nickel of a given ratio are melted together to form an alloy. The molten alloy is preserved in a preheated crucible which has a nozzle to spray out the liquid state alloy. The sprayed liquid alloy flow is impacted by an inert gas flow to be atomized and then collected. The atomized powders are then sieved with screens to separate powders of 300, 400 and/or 500 mesh of which the size is approximately equal to 0.037 mm diameter from the remainders.

The process can be repeated with different ratios between the component material metals and/or other component metals to provide powders of different transition points. These powders are then mixed with a certain ratio therebetween as described above. For example, in FIG. 5, suppose the individual overall displacement of material A is FA and that of material B is FB, then the resulting overall displacement of their mix is $F = 30\%FA + 70\%FB$.

Figure 4:
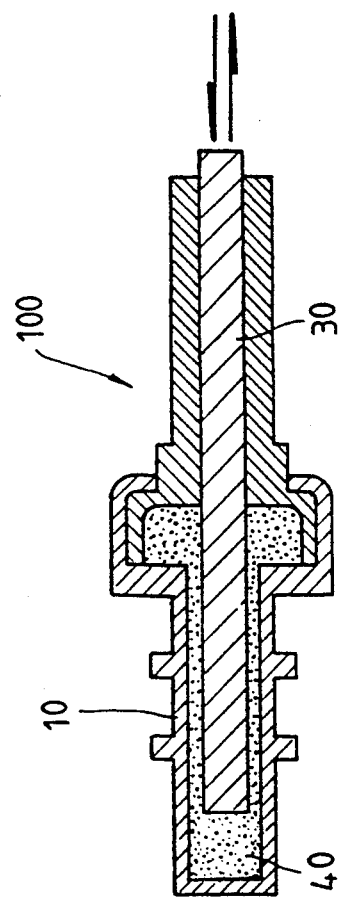
FIG. 4 is a cross-sectional view showing an embodiment of the temperature sensitive controlling device made in accordance with the present invention.

The present invention may be applied in many different fields Taking thermostatic faucet as an example, the shaft 30 of the device 100 shown in FIG. 4 can be attached to a valve of the faucet (only the part of the control thereof shown in FIG. 4) so that when the SMA powders 40 within the casing 10 is subject to temperature variation and thus change its dimension to move the shaft 40, the extent of the opening of the valve can be controlled. When the temperature increases, the shaft 40 is moved outward and the connection between the shaft 40 and the valve can be designed to cut down the flow rate of high temperature flow under so that a constant temperature may be maintained.

It is apparent that although the invention has been described in connection with a preferred embodiment, those skilled in the art may make changes to certain features of the preferred embodiment without departing from the spirit and scope of the invention as defined in the appended claims.

What is claimed is:

1. A temperature sensitive controlling device comprising a thermal conductive casing inside which powders of a plurality of shape memory alloys having different transition points are sealed with a movable member partially inserted therein so that when said powders are subject to a temperature variation, said moveable member is moved by a change in volume of said powders, said moveable member having a portion protruding out of said casing to provide an output means.

2. A temperature sensitive controlling device as claimed in claim 1 wherein said plurality of powders of shape memory alloy comprise at least two shape memory alloys.

3. A temperature sensitive controlling device as claimed in claim 1 wherein said powders are made of particles of a suitable size.

4. A temperature sensitive controlling device as claimed in claim 3 wherein said suitable size comprises 300–500 mesh size.

5. A temperature sensitive controlling device as claimed in claim 1 wherein said shape memory alloys are made of copper, aluminum and nickel.

* * * * *